United States Patent
Frem et al.

(10) Patent No.: US 10,459,600 B2
(45) Date of Patent: Oct. 29, 2019

(54) CONVERSION OF PLATFORM-INDEPENDENT ACCESSIBILITY LOGIC INTO PLATFORM-SPECIFIC ACCESSIBILITY FUNCTIONALITY

(71) Applicant: Microsoft Technology Licensing, LLC, Redmond, WA (US)

(72) Inventors: Peter Frem, Bothell, WA (US); Andreas Eulitz, Seattle, WA (US); Khalef Hosany, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 453 days.

(21) Appl. No.: 14/928,431

(22) Filed: Oct. 30, 2015

(65) Prior Publication Data

US 2016/0378300 A1  Dec. 29, 2016

Related U.S. Application Data

(60) Provisional application No. 62/183,915, filed on Jun. 24, 2015.

(51) Int. Cl.
| | |
|---|---|
| *G06F 8/40* | (2018.01) |
| *G06F 8/76* | (2018.01) |
| *G06F 3/0481* | (2013.01) |
| *G06F 8/20* | (2018.01) |
| *G06F 3/0484* | (2013.01) |
| *G06F 3/0488* | (2013.01) |
| *G06F 9/451* | (2018.01) |
| *G06F 9/455* | (2018.01) |

(52) U.S. Cl.
CPC ........ *G06F 3/04817* (2013.01); *G06F 3/0488* (2013.01); *G06F 3/04842* (2013.01); *G06F 8/20* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 5,757,925 A | * | 5/1998 | Faybishenko | ......... G06F 9/4443 706/47 |
| 6,066,181 A | * | 5/2000 | DeMaster | ................. G06F 8/30 717/148 |
| 6,131,166 A | | 10/2000 | Wong-Insley | |

(Continued)

FOREIGN PATENT DOCUMENTS

WO   WO 2004031947 A1   4/2004

OTHER PUBLICATIONS

Second Written Opinion for International Patent Application No. PCT/US2016/039121, dated Mar. 24, 2017, date of filing: Jun. 24, 2016, 7 pages.

(Continued)

*Primary Examiner* — Yongjia Pan
(74) *Attorney, Agent, or Firm* — Christopher J. Volkman; Kelly, Holt & Christenson, PLLC (57) ABSTRACT

An accessibility framework exposes a uniform application interface to applications with accessibility functionality. It receives abstract user interface components and provides them, through a platform-specific interface, to an accessibility framework, for processing.

15 Claims, 10 Drawing Sheets

(56) References Cited

U.S. PATENT DOCUMENTS

| | | | |
|---|---|---|---|
| 6,295,638 B1* | 9/2001 | Brown | G06F 9/44557 717/148 |
| 6,701,383 B1 | 3/2004 | Wason et al. | |
| 6,718,534 B1* | 4/2004 | Carter | G06F 9/451 717/100 |
| 6,738,967 B1* | 5/2004 | Radigan | G06F 8/47 717/146 |
| 6,957,439 B1* | 10/2005 | Lewallen | G06F 8/51 717/106 |
| 6,996,565 B2* | 2/2006 | Skufca | G06F 17/30893 |
| 7,069,562 B2* | 6/2006 | Kushnirskiy | G06F 9/443 712/E9.084 |
| 7,134,119 B2* | 11/2006 | Nevill | G06F 9/30101 717/139 |
| 7,240,327 B2 | 7/2007 | Singh et al. | |
| 7,392,483 B2 | 6/2008 | Wong et al. | |
| 7,707,547 B2* | 4/2010 | Colton | G06F 8/52 709/246 |
| 8,091,036 B1 | 1/2012 | Pavek et al. | |
| 8,234,622 B2* | 7/2012 | Meijer | G06F 8/36 717/104 |
| 8,601,449 B2 | 12/2013 | Clevenger | |
| 8,745,573 B2 | 6/2014 | Ben-Artzi et al. | |
| 8,910,115 B2 | 12/2014 | Reddy et al. | |
| 9,336,023 B2* | 5/2016 | Mukkamala | G06F 8/20 |
| 9,465,608 B2* | 10/2016 | Araya | G06F 8/447 |
| 9,645,814 B1* | 5/2017 | Roque | G06F 8/71 |
| 9,653,043 B2* | 5/2017 | Chang | G09G 5/373 |
| 2002/0174161 A1* | 11/2002 | Scheetz | G06F 9/443 718/100 |
| 2004/0158813 A1* | 8/2004 | Xia | G06F 8/60 717/116 |
| 2004/0163046 A1* | 8/2004 | Chu | H04L 67/36 715/251 |
| 2006/0129972 A1 | 6/2006 | Tyburski et al. | |
| 2006/0248506 A1* | 11/2006 | Luo | G06F 8/38 717/104 |
| 2007/0074192 A1* | 3/2007 | Geisinger | G06F 9/45537 717/148 |
| 2007/0283324 A1* | 12/2007 | Geisinger | G06F 9/455 717/120 |
| 2009/0249282 A1* | 10/2009 | Meijer | G06F 8/36 717/104 |
| 2011/0078678 A1 | 3/2011 | Matthews | |
| 2011/0145782 A1* | 6/2011 | Brukner | G06F 8/36 717/104 |
| 2011/0258595 A1* | 10/2011 | Clevenger | G06F 8/40 717/106 |
| 2011/0314376 A1* | 12/2011 | Dearman | G06F 3/0481 715/711 |
| 2011/0314389 A1* | 12/2011 | Meredith | G06F 8/60 715/751 |
| 2013/0205277 A1* | 8/2013 | Seven | G06F 8/38 717/121 |
| 2013/0305218 A1* | 11/2013 | Hirsch | G06F 8/30 717/106 |
| 2014/0026086 A1 | 1/2014 | Zuverink et al. | |
| 2014/0047413 A1* | 2/2014 | Sheive | H04L 65/403 717/110 |
| 2014/0109197 A1 | 4/2014 | Schneider et al. | |
| 2014/0125672 A1* | 5/2014 | Winternitz | G06F 8/38 345/440 |
| 2014/0215446 A1* | 7/2014 | Araya | G06F 8/76 717/137 |
| 2015/0106692 A1* | 4/2015 | Bolchini | G06F 3/0487 715/234 |
| 2016/0034276 A1* | 2/2016 | Webb | G06F 8/76 726/2 |
| 2016/0092176 A1* | 3/2016 | Straub | G06F 8/34 717/107 |
| 2016/0110667 A1* | 4/2016 | Clevenger | G06F 8/40 705/7.23 |

OTHER PUBLICATIONS

International Search Report and Written Opinion for International Patent Application No. PCT/US2016/039121, dated Aug. 23, 2016, date of filing: Jun. 24, 2016, 14 pages.

Andres Gonzalez et al.: "Platform-Independent Accessbility API: Accessible Document Object Model", Proceedings of the 2005 International Cross-Disciplinary Workshops on Web Accessibility (W4A), W4A '05, Jan. 1, 2005, 9 pages.

Junko Shirogane et al.: "Method to Improve Accessibility of Rich Internet Applications", Jan. 1, 2011, 17 pages.

Heitkotter, et al., "Evaluating Cross-Platform Development Approaches for Mobile Applications", In Proceedings of 8th International Conference on Web Information Systems and Technologies, Apr. 18, 2012, 20 pages.

Palmieri, et al., "Comparison of Cross-Platform Mobile Development Tools", In Proceedings of 16th International Conference on Intelligence in Next Generation Networks, Oct. 8, 2012, pp. 179-786.

"International Preliminary Report on Patentability Issued in PCT Application No. PCT/US2016/039121", dated Jun. 21, 2017, 9 Pages.

* cited by examiner

CONVERSION OF PLATFORM-INDEPENDENT ACCESSIBILITY LOGIC INTO PLATFORM-SPECIFIC ACCESSIBILITY FUNCTIONALITY

CROSS-REFERENCE TO RELATED APPLICATION

The present application is based on and claims the benefit of U.S. provisional patent application Ser. No. 62/183,915, filed Jun. 24, 2015, the content of which is hereby incorporated by reference in its entirety.

BACKGROUND

Computer systems are currently in wide use. Some computer systems run applications that have accessibility components that allow users with disabilities to more easily access the application functionality. In doing so, applications often specify certain functionality as accessibility functionality that can communicate with an accessibility client. For instance, an accessibility client may be a screen reader that audibly reads items on a screen to a user. It may be a screen magnifier that greatly magnifies the items on the screen, or it may be other clients.

Accessibility frameworks often have platform-specific interfaces. For instance, an accessibility client that is supported by one operating system may have an application programming interface (API) specific to that operating system (or platform). An accessibility client on a different operating system (or platform) may have a different API. Therefore, when a developer develops an application that includes accessibility functionality, the developer often authors multiple different versions of the application to communicate with the different APIs supported by the platforms on which the accessibility clients run. Developing accessible applications across platforms, in this way, has a relatively high cost due to the different APIs on each platform.

The discussion above is merely provided for general background information and is not intended to be used as an aid in determining the scope of the claimed subject matter.

SUMMARY

An accessibility system exposes a uniform application interface to applications with accessibility functionality. It receives abstract user interface components and provides them, through a platform-specific interface, to an accessibility client, for processing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
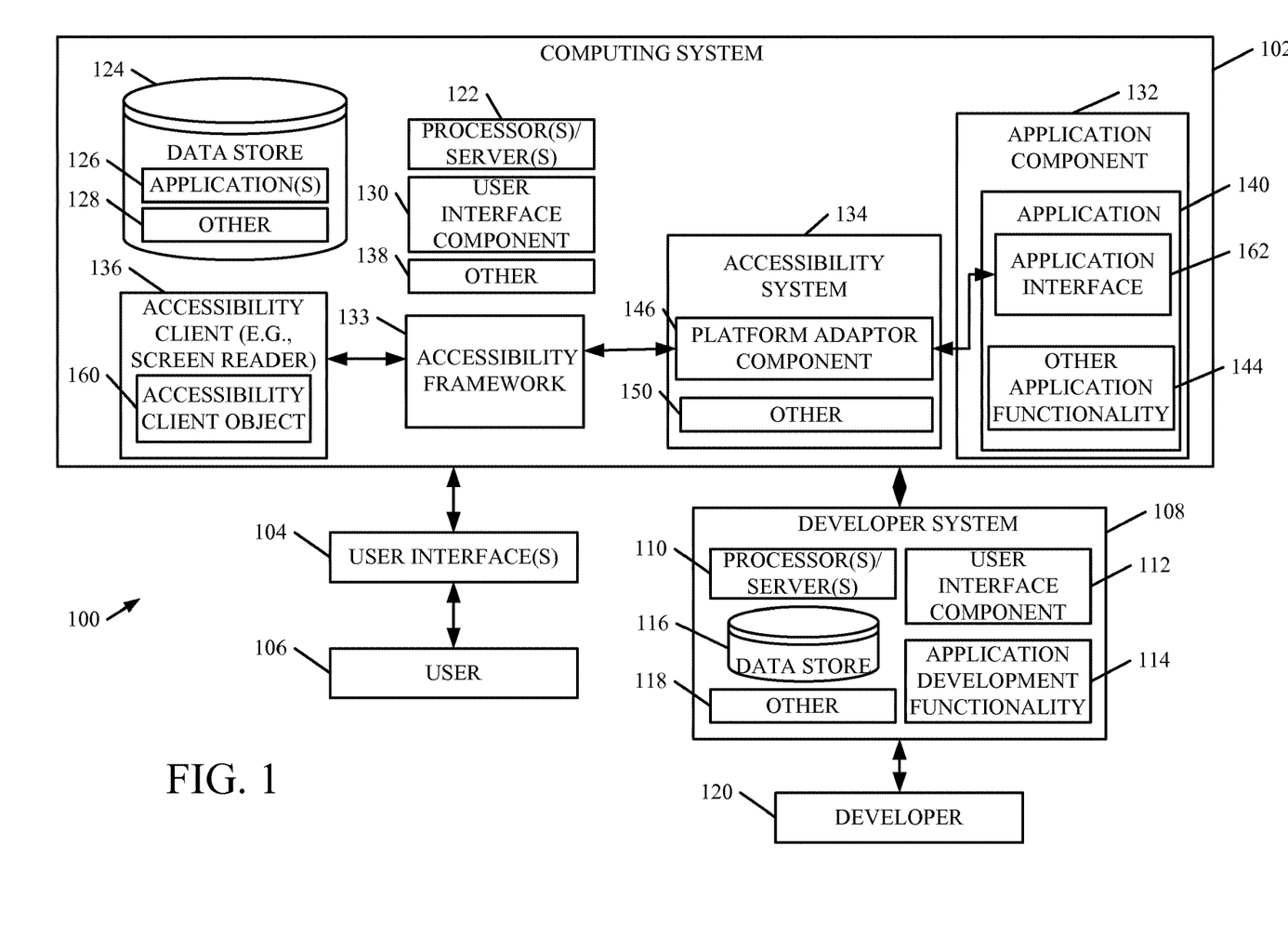
FIG. 1 is a block diagram of one example of a computing system architecture.

FIG. 1 is a block diagram of one example of a computing system architecture 100. Architecture 100 illustratively includes computing system 102 that generates user interfaces 104 for interaction by user 106. User 106 illustratively interacts with or through user interfaces 104 to control and manipulate computing system 102. In one example, user interface 104 is a visual representation of an entity that can also be, for accessibility purposes, represented by an accessibility object 142 (described below).

Architecture 100 also shows a developer system 108. Developer system 108 illustratively includes one or more processors or servers 110, user interface component 112, application development functionality 114, data store 116, and it can include other items 118. Developer 120 illustratively interacts with developer system 108 (and application development functionality 114) to develop applications that can be run by computing systems, such as computing system 102. In doing so, developer 120 illustratively develops applications with accessibility functionality that allow the applications to be accessed and used by people with various disabilities. A developer workflow is described in more detail below with respect to FIG. 3C.

In the example shown in FIG. 1, computing system 102 illustratively includes one or more processors or servers 122, data store 124 that can illustratively store one or more applications 126 (and a wide variety of other information 128), user interface component 130, application component 132, accessibility framework 133, accessibility system 134, accessibility client 136, and it can include a wide variety of other items 138.

Before describing the operation of architecture 100 in more detail, a brief overview will first be provided. Application component 132 illustratively runs one or more applications 140 (which can also be applications 126 in data store 124) that interacts with abstract accessibility objects 142 through a set of abstract object interfaces (or application interfaces) 162. The application 140 can have other application functionality 144. The abstract accessibility objects 142 illustratively represent accessibility information (as will be described in greater detail below) in a platform-independent way.

Accessibility system 134 illustratively includes accessibility platform adapter component 146, and it can include other items 150. Platform adapter component 146 illustratively receives abstract accessibility objects 142 through a uniform application interface 162 that is also used by application 140. It illustratively wraps the abstract accessibility objects 142 in a platform-specific wrapper (or platform adaptor). Client 136 receives the platform-specific wrapper through the accessibility framework 133 of the particular operating system being used. Once received, the wrapped object becomes an accessibility client object 160 which can then be acted on by client 136. Client 136, for instance, may be a screen reader or another accessibility client that consumes (or operates on) the wrapped objects through the platform adaptor (or wrapper). By way of example, application 140 may instantiate an abstract accessibility object 142 representing a button on a user interface display. That object is wrapped in a platform adaptor and can be accessed by accessibility client 136, through accessibility framework 133 and through the adaptor. Client 136 reads the label on the button and reproduces it through a suitable user interface 104 (such as a loud speaker) to a disabled user 106.

Also, by way of overview, it will be noted that developer 120 can develop application 140 in a platform-independent way. Accessibility system 134 can include a plurality of different platform adapters that adapt the accessibility information in application 140 to a plurality of different platforms. Thus, with a single development effort, the application 140 can thus be consumed by accessibility clients on a wide variety of different platforms. This significantly reduces the complexity and effort needed to make application 140 accessible in this way, across platforms.

Figure 2:
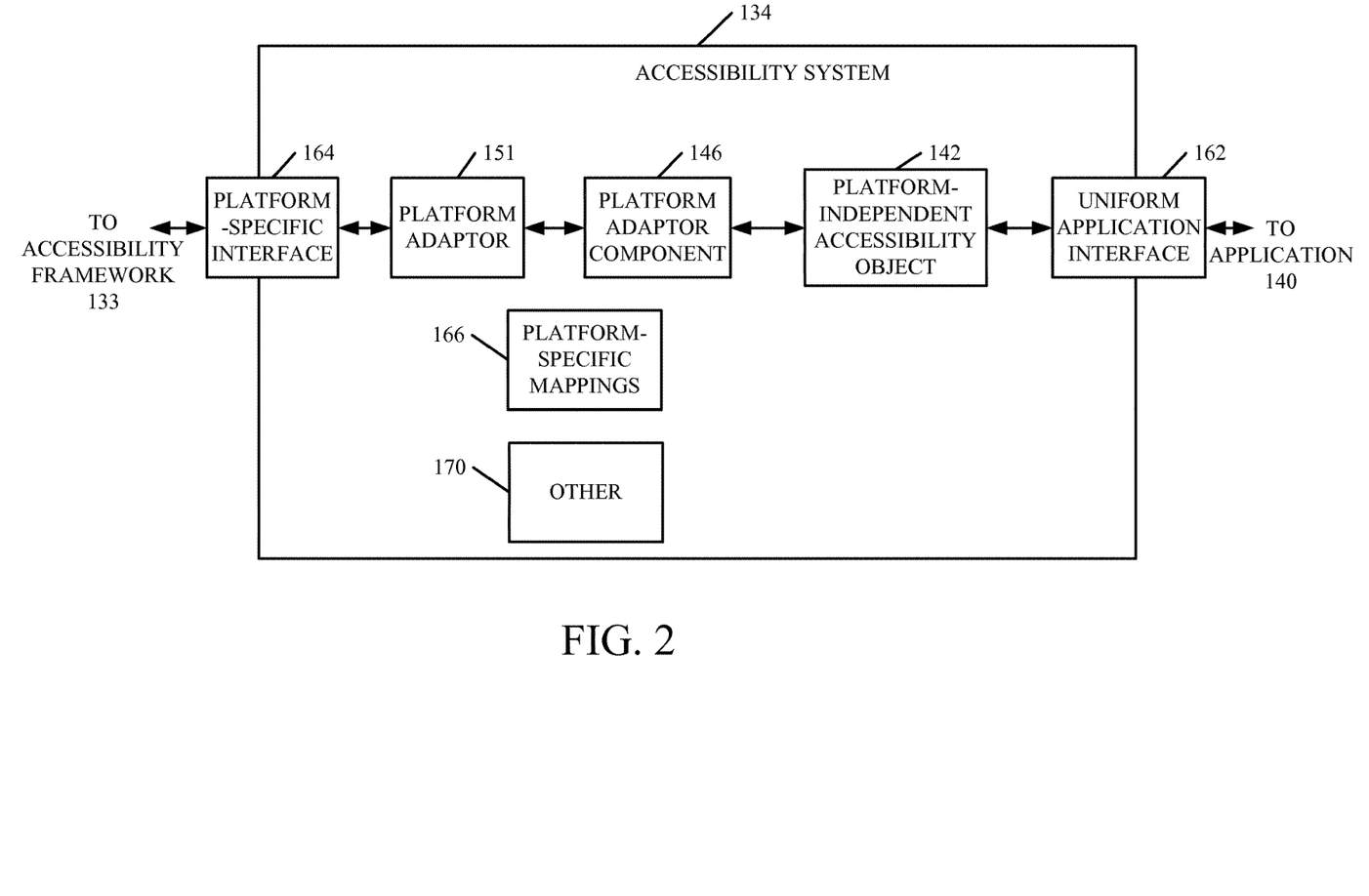
FIG. 2 is a more detailed block diagram of one example of an accessibility platform adapter component.

FIG. 2 is a block diagram illustrating one example of interaction between the abstract objects and platform adapter component 146, in more detail. Accessibility system 134 illustratively includes uniform application interface 162, platform-specific interface 164, platform-specific mappings 166, platform adapter component 146, and it can include other items 170. In the example shown in FIG. 2, system 134 illustratively exposes uniform application interface 162 to applications, such as application 140. For instance, interface 162 is uniform, regardless of which particular platform the client is interacting with, and regardless of which particular application 140 is using it.

System 134 also illustratively exposes platform-specific interface 164 to accessibility framework 133 (which is illustratively an operating system accessibility layer). Accessibility framework 133 illustratively interacts with platform-specific API 164.

Platform-specific mappings 166 illustratively map the various accessibility information received through uniform application interface 162 (from any applications interacting through interface 162) to the platform-specific APIs of the accessibility framework 133. It will be noted that the channel shown in FIG. 2 is a two-way channel. Therefore, mapping 166 also maps information/control in the opposite direction as well. Platform adaptor component 146 uses the mapping 166 to wrap the abstract accessibility objects 142 instantiated by application 140 in framework-specific or platform-specific accessibility object wrappers (or platform adaptors) 151. The platform-specific interface 164 can be used to access the accessibility information through the platform adaptor 151.

Figure 3A:
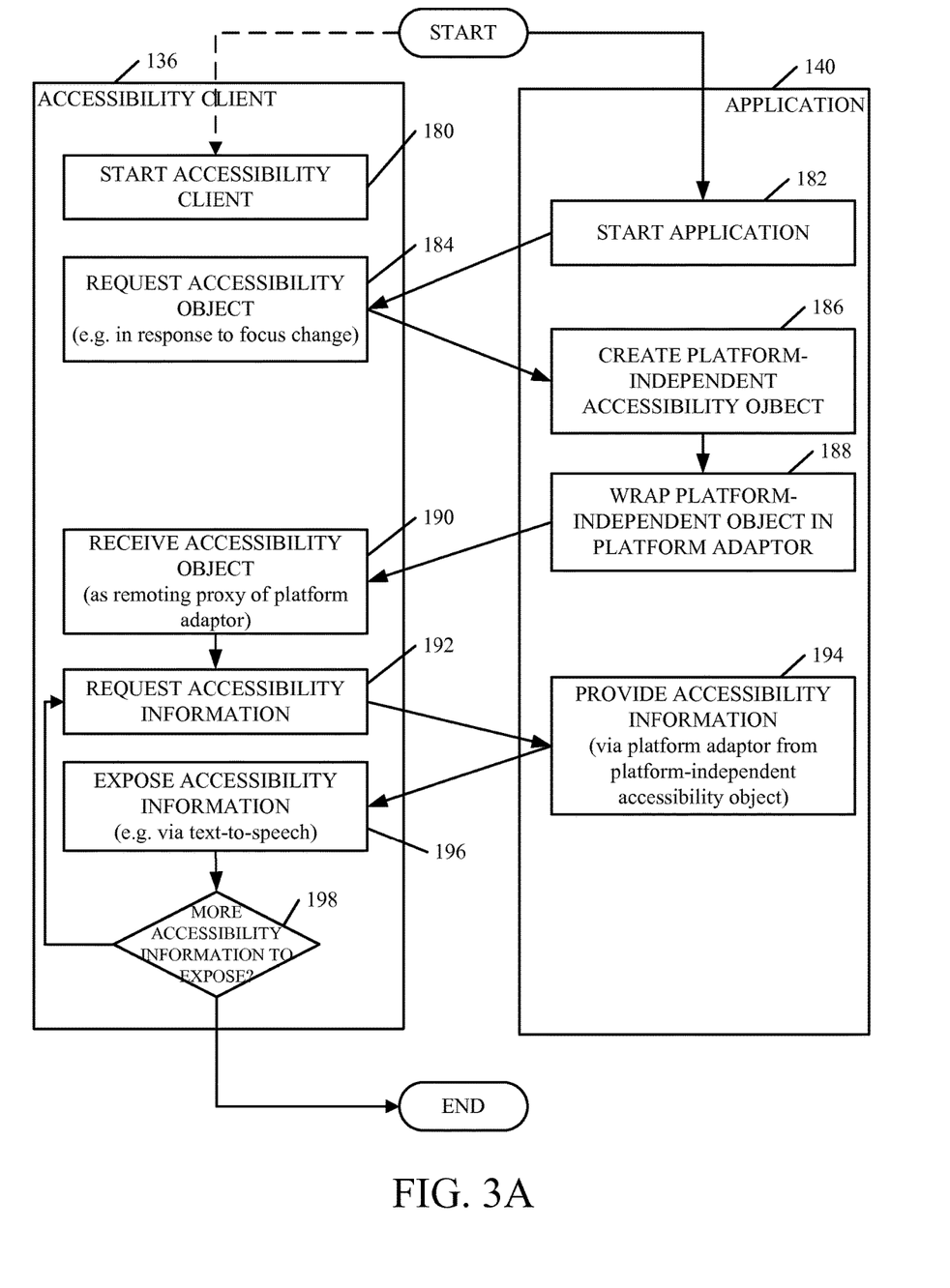
FIG. 3A is a flow diagram illustrating one example of the operation of the architecture shown in FIG. 1, in processing accessibility information in a workflow initiated by a client.
Figure 3B:
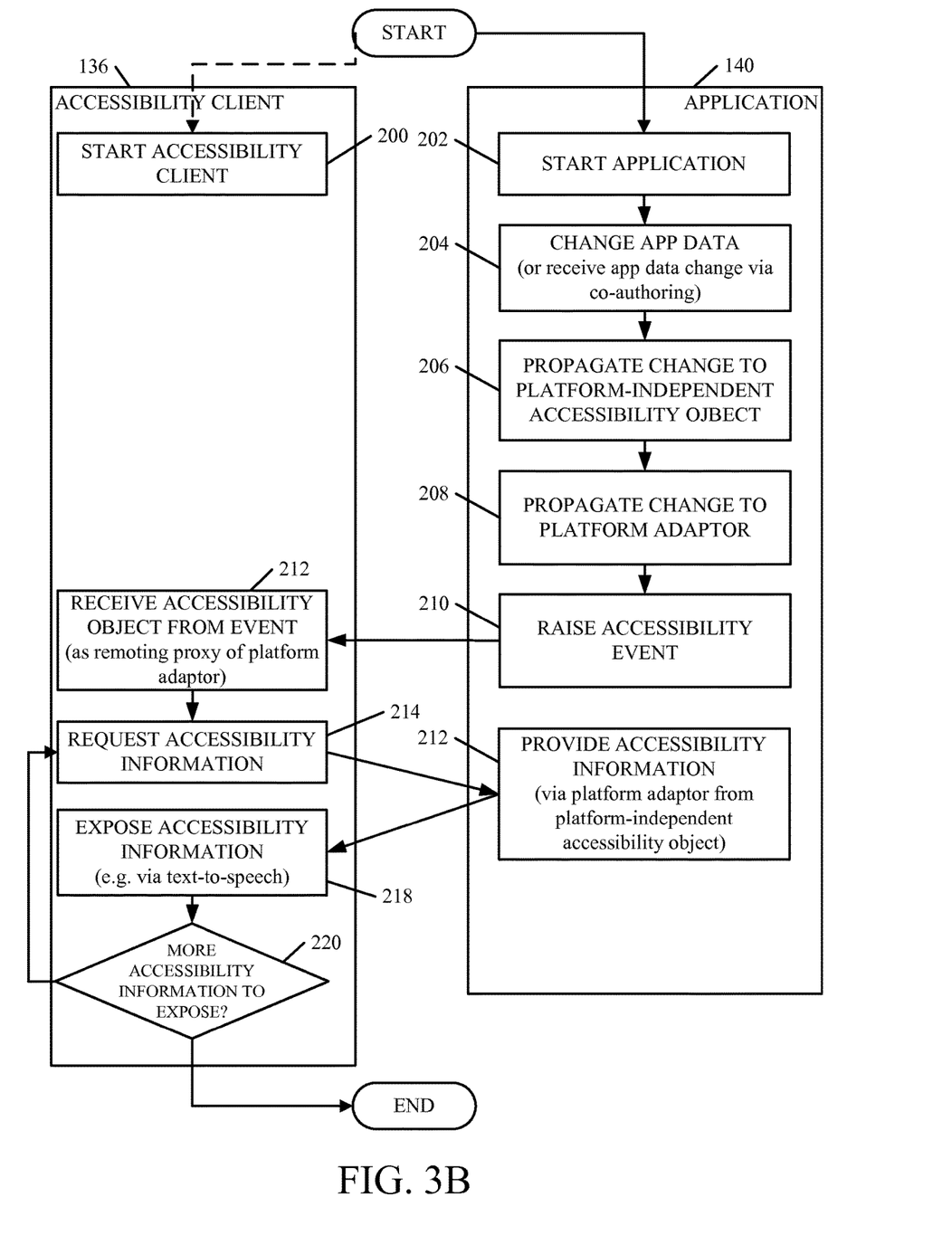
FIG. 3B is a flow diagram illustrating one example of the operation of the architecture shown in FIG. 1, in processing accessibility information in a workflow initiated by an application.

FIGS. 3A and 3B are flow diagrams illustrating one example of the operation of architecture 100 in running application 140 and processing accessibility information. FIG. 3A shows a workflow initiated by an accessibility client 136. FIG. 3B shows a workflow initiated by an application 140. It is first noted that, for both FIGS. 3A and 3B, it is assumed that application 140 has been authored to instantiate a set of abstract accessibility objects 142 that represent accessibility information. A compiler (which can be part of computing system 102) illustratively compiles application 140 and a particular accessibility platform adaptor 151 for use with the operating system (or platform) on which accessibility client 136 is deployed.

Referring to FIG. 3A, one or more processors or servers 122 illustratively start the accessibility client 136 and use application component 132 to begin running application 140. This is indicated by blocks 180 and 182.

A user using application 140 then provides an input to change focus of the application, and, in response, accessibility client 136 requests an accessibility object. This is indicated by block 184 in FIG. 3A.

Application 140 receives the request and creates (or instantiates) a platform-independent accessibility object. Platform adaptor component 146 accesses mappings 166 and wraps the platform-independent object in a wrapper (or platform adaptor) so that it is consistent with the accessibility platform used by framework 133 (and the accessibility client 136). Creating the platform-independent accessibility object is indicated by block 186. Wrapping it in a platform-specific wrapper (or platform adaptor) is indicated by block 188 in FIG. 3A.

Accessibility system 134 then exposes the accessibility information in the wrapped accessibility object to the accessibility client 136 through accessibility framework 133, using the platform-specific interface 164. The accessibility client 136 receives the wrapped object as a proxy of the platform adaptor (or wrapper) 151. This is indicated by block 190 in FIG. 3A.

Accessibility client 136 then requests accessibility information through the platform adaptor 151 and the application 140 provides the information, from the platform independent accessibility object, through the platform adaptor 151. Requesting the accessibility information and providing it through the platform adaptor is indicated by blocks 192 and 194 in FIG. 3A.

The accessibility client 136 then surfaces the accessibility information for the user. This is indicated by block 196. By way of example, client 136 may use a text-to-speech component to audibly read text provided through the platform adapter 151 to the user.

Client 136 can continue to request accessibility information from, and receive it through, the platform adaptor 151 until there is no more accessibility information to expose. This is indicated by block 198 in FIG. 3A.

FIG. 3B illustrates a workflow for processing accessibility information, that is initiated by application 140. Again, as with the workflow described above with respect to FIG. 3A, the accessibility client and application are started. This is indicated by blocks 200 and 202 in FIG. 3B.

The application 140 then detects a data change. This can be detected based on a user input, based on a co-authoring input, or in other ways. Changing the application data is indicated by block 204 in FIG. 3B.

Application 140 then instantiates a platform-independent accessibility object 142 to propagate the data change to the object. This is indicated by block 206.

The change is propagated to platform adaptor component 146, which wraps the platform-independent accessibility object in a platform-specific wrapper (or platform adaptor) 151, based on the mappings 166. The application 140 raises an accessibility event with the accessibility framework 133, and accessibility client 136 receives access to the wrapped accessibility object from the event, as a proxy of the platform adaptor 151, as discussed above. Propagating the data change to the platform adaptor component 146 where it is wrapped in the platform-specific wrapper 151 is indicated by block 208. Raising the accessibility event is indicated by block 210 and receiving the accessibility event by way of proxy, through the platform adaptor 151, is indicated by block 212.

The accessibility client 136 then requests accessibility information from the platform-independent accessibility object 142, through the platform adaptor 151. This is indicated by block 214. The application 140, in turn, provides the requested accessibility information from the platform-independent accessibility object 142, to the accessibility client 136, through the platform adaptor 151. This is indicated by block 216. Accessibility client 136 then surfaces the accessibility information (such as using a text-to-speech system). This is indicated by block 218.

The process of requesting accessibility information, receiving it through the platform adaptor 151, and exposing it, is repeated until no more accessibility information is to be exposed. This is indicated by block 220.

Figure 3C:
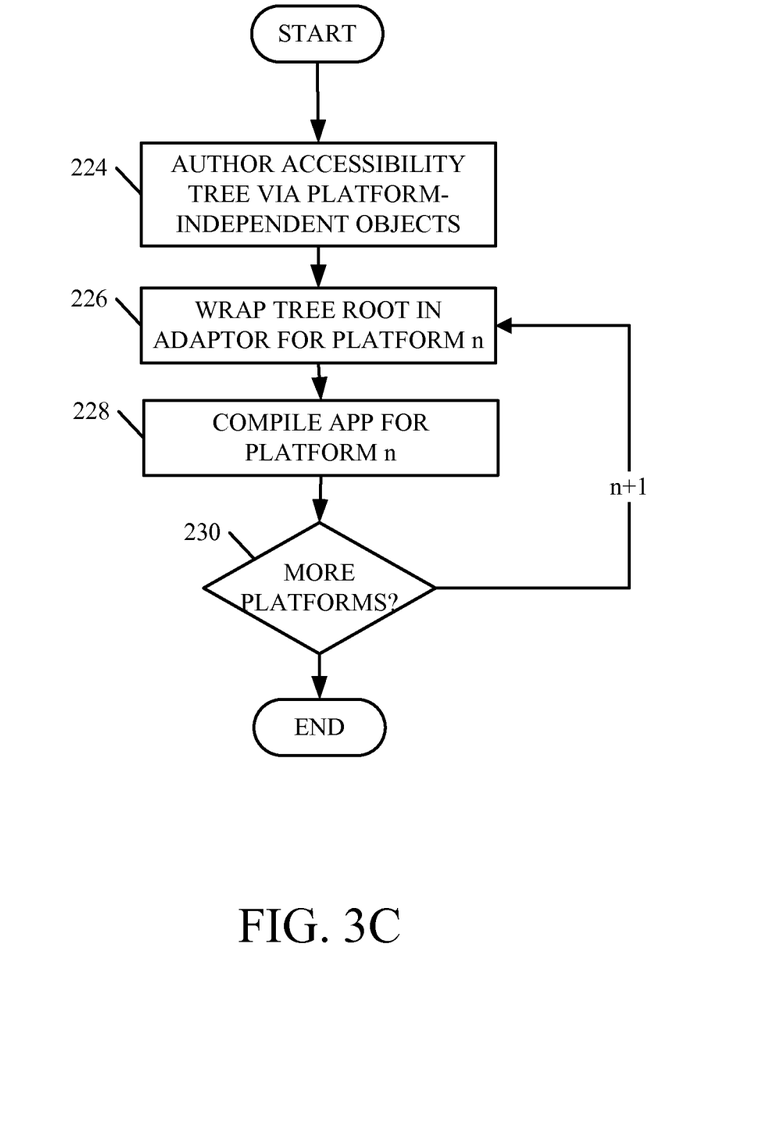
FIG. 3C is a flow diagram illustrating a developer workflow.

FIG. 3C is a flow diagram illustrating one example of a developer workflow, in which a developer 120 is developing an application 140 for different accessibility platforms. Developer 120 first uses application development functionality to author the application functionality and to author an accessibility tree that specifies the accessibility information for the various portions of the application. Developer 120 does this using platform-independent accessibility objects. Thus, the accessibility tree is defined in a platform-independent way. This is indicated by block 224 in FIG. 3C.

The accessibility tree may (but need not necessarily) be similar to a user interface element tree for the application, and will illustratively have a root node and a set of descendent nodes. The developer 120 then wraps the root node of the accessibility tree in a platform-specific wrapper (or platform adaptor) for a given platform. This is indicated by block 226.

Developer 120 (or another person or system) then initiates a compiler to compile the application for the given platform. This is indicated by block 228 in FIG. 3C.

If the developer wishes to make the application accessible on other platforms, processing reverts to block 226, where the developer wraps the root node of the accessibility tree in a platform-specific wrapper (or platform adaptor) for the next platform, and compiles the application for that platform. This continues until the developer 120 has wrapped the root node of the accessibility tree for the application in a platform adaptor for all desired platforms. This is indicated by block 230 in FIG. 3C.

It can thus be seen that this provides a number of significant improvements. First, a developer develops an application using platform-independent accessibility objects. By wrapping those objects in a platform adaptor, they can be accessed through platform-specific APIs. This enables accessibility functionality, from a single development effort, to be used across multiple different platforms.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
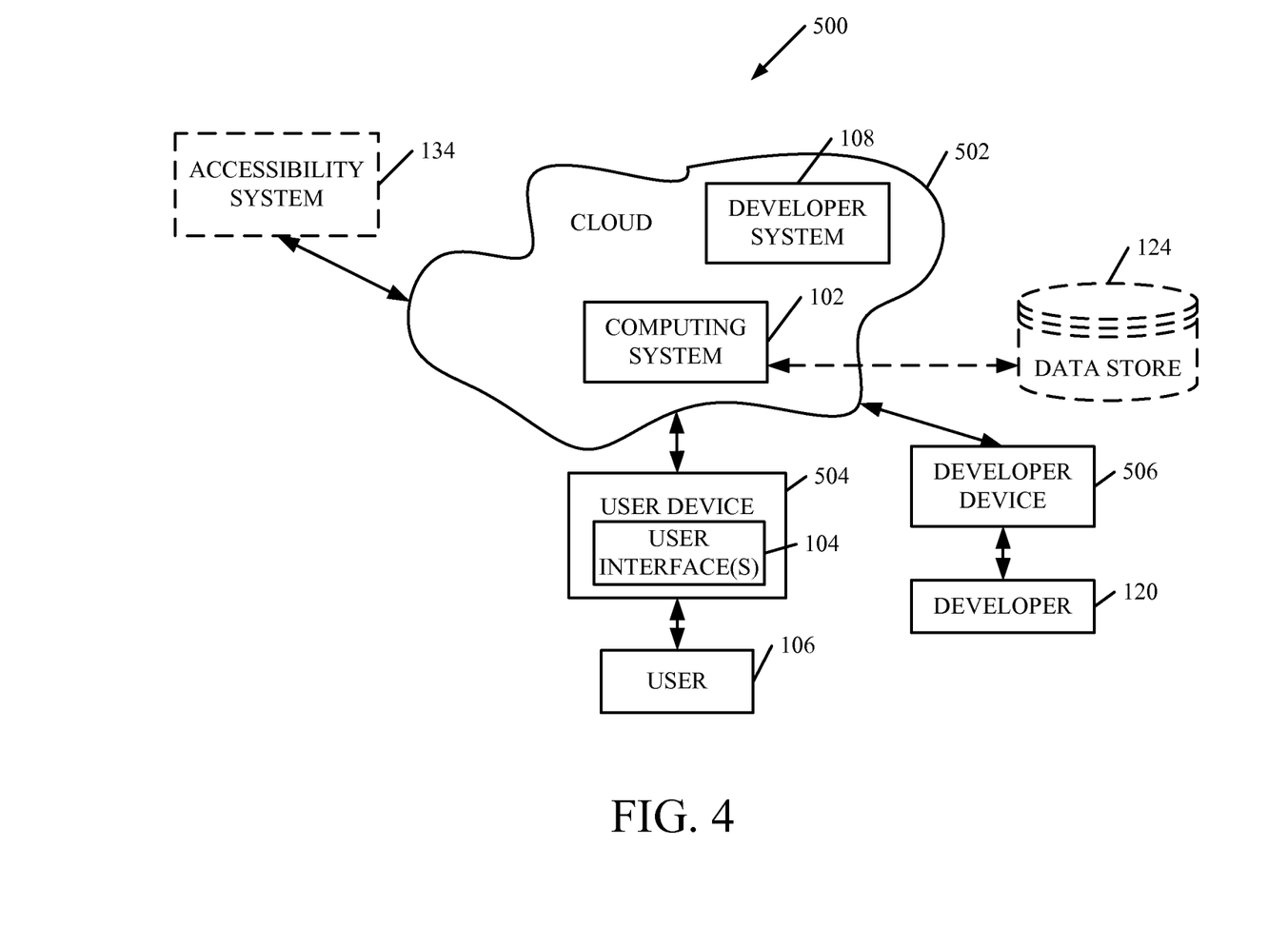
FIG. 4 is a block diagram showing one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that systems 102 and 108 can be located in cloud 502 (which can be public, private, or a combination where portions are public while others are private). Therefore, user 106 and developer 120 can use a user device 504 and a developer device 506 to access those systems through cloud 502.

FIG. 4 also depicts another example of a cloud architecture. FIG. 4 shows that it is also contemplated that some elements of architecture 100 can be disposed in cloud 502 while others are not. By way of example, data store 124 can be disposed outside of cloud 502, and accessed through cloud 502. In another example, accessibility framework 134 can also be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
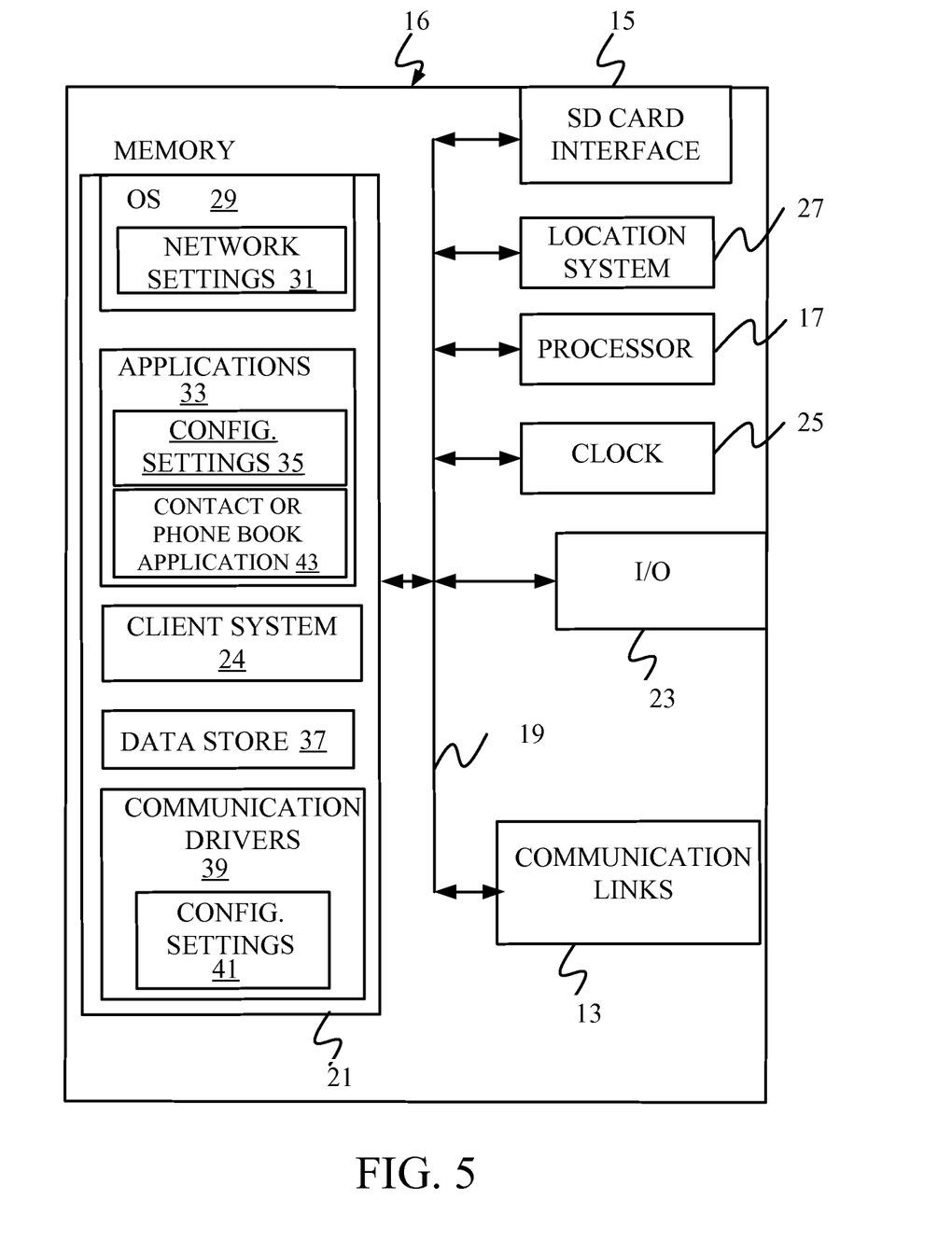
FIGS. 5-7 show examples of mobile devices that can be used in the architectures shown in the previous figures.
Figure 6:
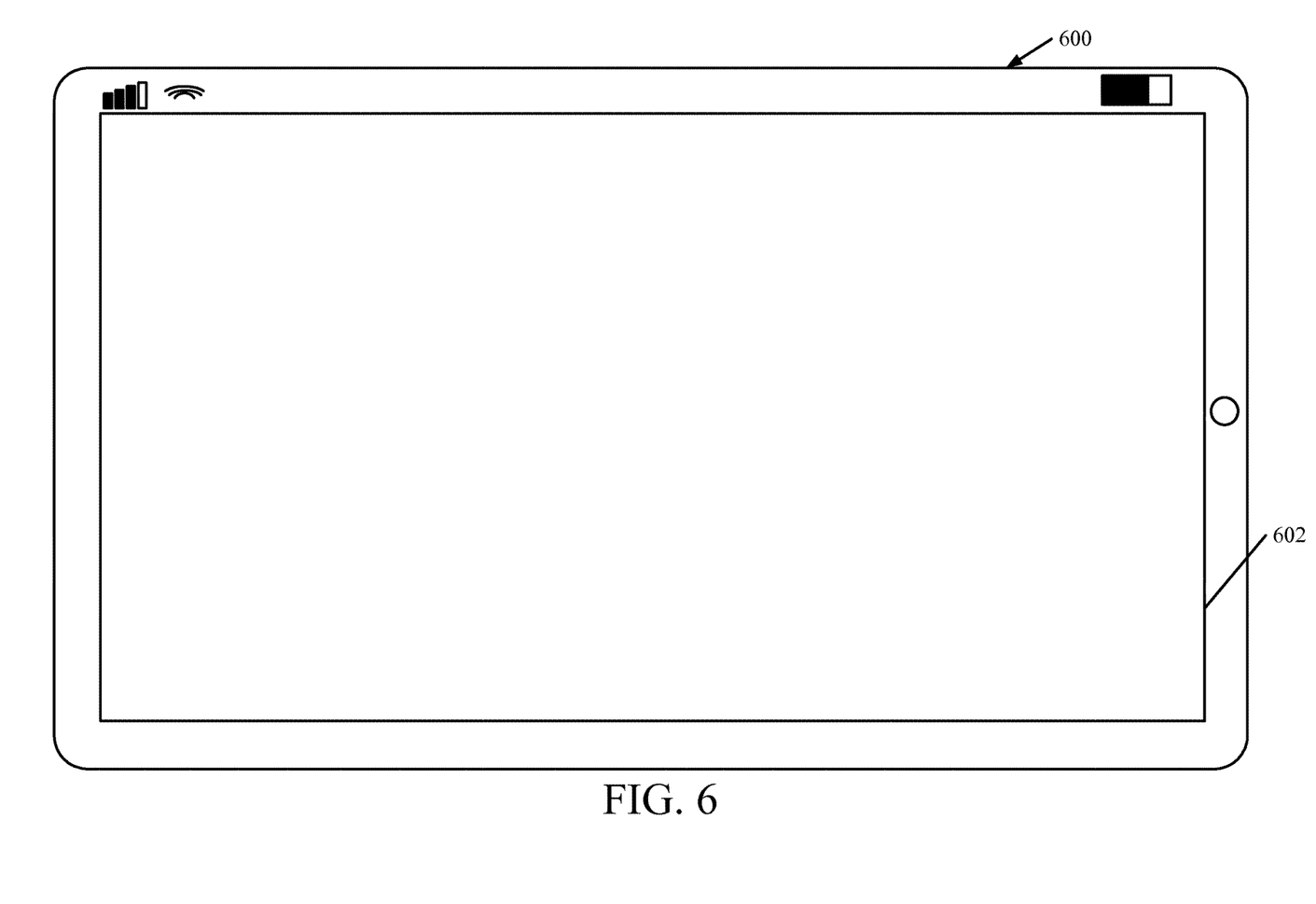
Figure 7:
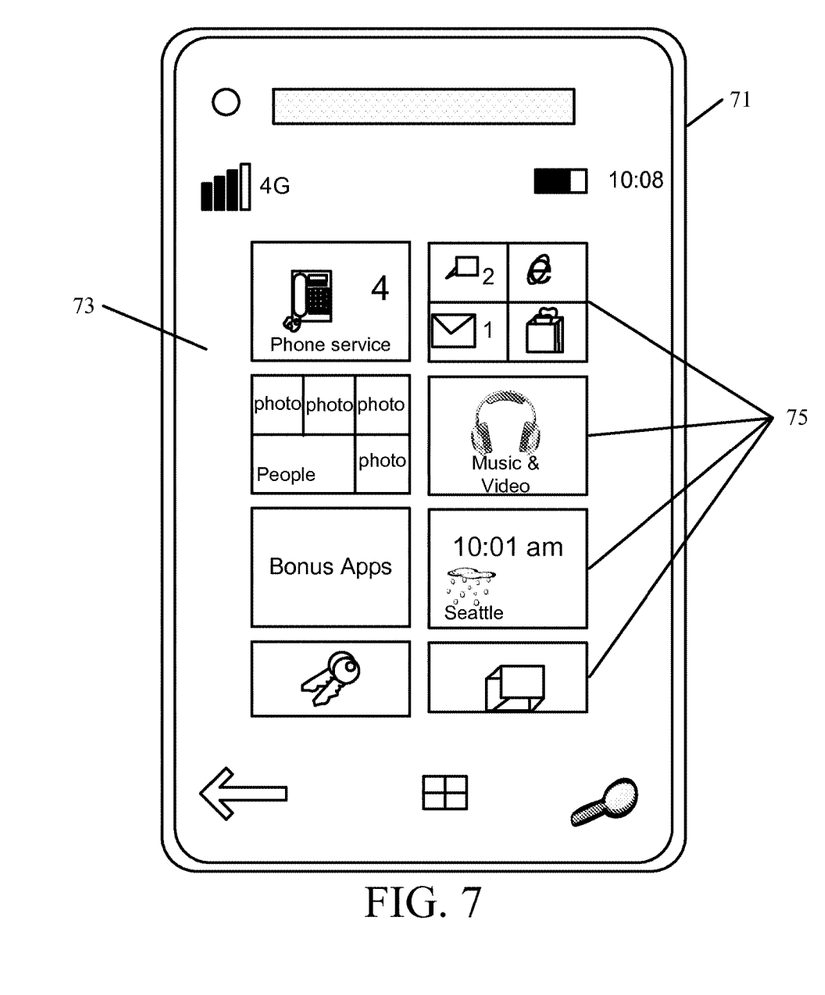

FIG. 5 is a simplified block diagram of one illustrative embodiment of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 110 or 122 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
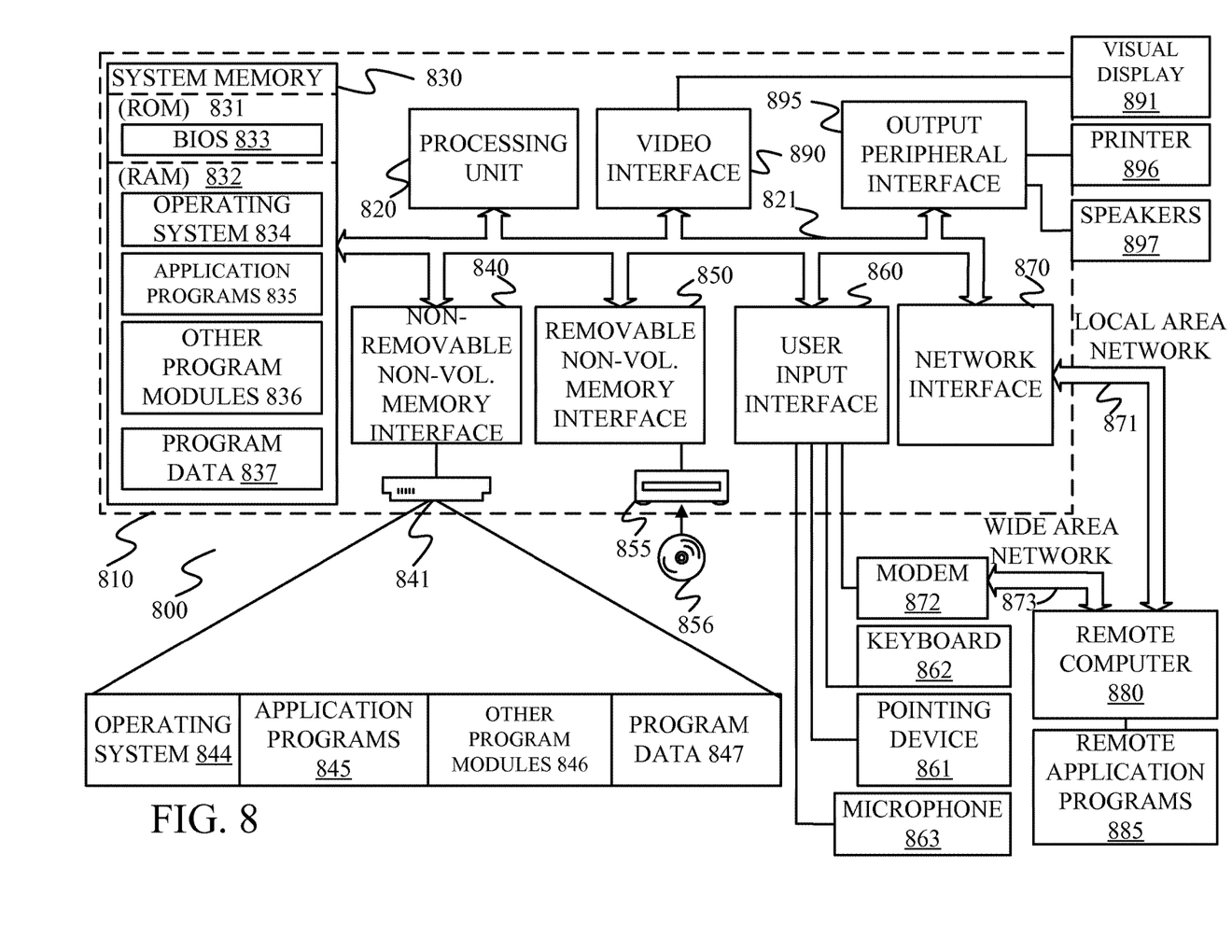
FIG. 8 is a block diagram of one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers 110 or 122), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
an application component that runs an application with a platform-independent accessibility object that represents accessibility information in the application; and
an accessibility system that has a uniform application interface, that receives the platform-independent accessibility object, and a platform-specific interface, that provides access to the accessibility information in the platform-independent accessibility object to an accessibility client through a platform-specific accessibility framework.

Example 2 is the computing system of any or all previous examples wherein the accessibility system exposes the uniform application interface to the application component and exposes the platform-specific interface to the platform-specific accessibility framework.

Example 3 is the computing system of any or all previous examples wherein the accessibility system comprises:
a set of platform-specific mappings that map the accessibility information in the platform-independent accessibility object to the platform-specific interface.

Example 4 is the computing system of any or all previous examples wherein the accessibility system comprises:
a platform adaptor component that wraps the platform-independent accessibility object in a platform adaptor that comprises a platform-specific wrapper, consumable by the platform-specific interface, based on the set of platform-specific mappings.

Example 5 is the computing system of any or all previous examples and further comprising:
a development system that receives a developer input to generate an application with accessibility information.

Example 6 is the computing system of any or all previous examples wherein the developer system generates the accessibility information as a tree with a root node and descendant nodes.

Example 7 is the computing system of any or all previous examples wherein the development system, in response to a developer input, wraps the root node of the tree in a platform adaptor.

Example 8 is the computing system of any or all previous examples wherein the development system, in response to a set of developer inputs, wraps multiple instances of the root node of the tree, each in a different platform adaptor.

Example 9 is the computing system of any or all previous examples wherein the accessibility client comprises a screen magnifier.

Example 10 is the computing system of any or all previous examples wherein the accessibility client comprises a screen reader.

Example 11 is the computing system of any or all previous examples wherein the platform adaptor component wraps the platform-independent accessibility object in a plurality of different accessibility platform adaptors, one corresponding to each different platform that has an accessibility client that the application component sends the accessibility information to in the computing system.

Example 12 is the computing system of any or all previous examples wherein the platform-independent accessibility object caches accessibility information corresponding to a user interface generated by the application.

Example 13 is the computing system of any or all previous examples wherein the application component controls the accessibility information cached in the platform-independent accessibility object based on a user interface focus of the application.

Example 14 is a computer-implemented method, comprising:
running an application that instantiates a platform-independent accessibility object that represents accessibility information in the application;
receiving the platform-independent accessibility object through a uniform application interface exposed by an accessibility system; and
providing the accessibility information in the platform-independent accessibility object to an accessibility framework for processing, through a platform-specific interface exposed by the accessibility system.

Example 15 is the computer implemented method of any or all previous examples wherein providing the accessibility information to the accessibility framework comprises:
mapping the accessibility information in the platform-independent accessibility object to a platform-specific application programming interface (API) used by the accessibility framework.

Example 16 is the computer implemented method of any or all previous examples wherein mapping comprises:
wrapping the platform-independent accessibility object in a platform-specific adaptor that is specific to the platform-specific API.

Example 17 is the computer implemented method of any or all previous examples and further comprising:
providing accessibility information from the platform-independent accessibility object to the accessibility framework through the platform-specific adaptor.

Example 18 is a computing system, comprising:
an application component that runs an application using a platform-independent accessibility object that represents accessibility information in the application; and
an accessibility system that exposes a uniform application interface, that receives the platform-independent accessibility object, and a platform-specific interface, that provides, access to the accessibility information in the platform-independent accessibility object to an accessibility framework for processing.

Example 19 is the computing system of any or all previous examples wherein the accessibility system comprises:
a platform adaptor component that wraps the platform-independent accessibility object in a platform-specific adaptor that is specific to the platform-specific interface.

Example 20 is the computing system of any or all previous examples wherein the platform-specific adaptor communicates accessibility information with an accessibility client, through the accessibility framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
an application component configured to run, in a runtime environment with a particular platform,
an application that generates a user interface, wherein the application creates a platform-independent accessibility object in response to a request for the platform-independent accessibility object, wherein the platform-independent accessibility object is independent of the particular platform, and
caches accessibility information corresponding to the user interface generated by the application;
a processor; and
memory storing instructions executable by the processor, wherein the instructions, when executed, provide:
an accessibility system that is separate from the application and comprises:
a uniform application interface exposed to the application and configured to receive the platform-independent accessibility object from the application;
a set of platform-specific mappings, wherein each platform-specific mapping maps the accessibility information in the platform-independent accessibility object to a different platform having an accessibility client; and
a platform adaptor component configured to:
based on the set of platform-specific mappings, wrap the platform-independent accessibility object in a platform adaptor that comprises a platform-specific wrapper, consumable by a platform-specific interface that is specific to the particular platform;
wherein the platform-specific interface is exposed to a platform-specific accessibility framework and configured to provide access to the accessibility information in the platform-independent accessibility object to the accessibility client of the particular platform through the platform-specific accessibility framework.

2. The computing system of claim 1 wherein the instructions provide:
a development system configured to receive a developer input to generate an application with accessibility information.

3. The computing system of claim 2 wherein the development system is configured to generate the accessibility information as a tree with a root node and descendant nodes.

4. The computing system of claim 3 wherein the development system is configured to, in response to a developer input, wrap the root node of the tree in a platform adaptor.

5. The computing system of claim 4 wherein the development system is configured to, in response to a set of developer inputs, wrap multiple instances of the root node of the tree, each in a different platform adaptor.

6. The computing system of claim 1 wherein the accessibility client comprises a screen magnifier.

7. The computing system of claim 1 wherein the accessibility client comprises a screen reader.

8. The computing system of claim 1 wherein the application component is configured to:
based on a user interface focus of the application, control the accessibility information cached in the platform-independent accessibility object.

9. A method performed by an accessibility system, the method comprising:
receiving a platform-independent accessibility object from an application that is running on a computing system platform and is separate from the accessibility system, wherein the application creates the platform-independent accessibility object in response to a request for the platform-independent accessibility object, the platform-independent accessibility object is received through a uniform application interface, that is
exposed to the running application by the accessibility system,
caches accessibility information corresponding to a user interface in the application running on the computing system platform, and
independent of the computing system platform;
wrapping the platform-independent accessibility object in a platform-specific wrapper that is specific to the computing system platform and consumable by a platform-specific interface that is:
specific to the computing system platform, and
exposed to a platform-specific accessibility framework; and
providing the platform-specific wrapper to the accessibility framework through the platform-specific interface, wherein an accessibility client associated with the platform-specific accessibility framework is configured to provide users access to application functionality based on the accessibility information.

10. The computer implemented method of claim 9 wherein providing the platform-specific wrapper to the accessibility framework comprises:
mapping the accessibility information in the platform-independent accessibility object to a platform-specific application programming interface (API) used by the accessibility framework.

11. The computer implemented method of claim 10 wherein mapping comprises:
wrapping the platform-independent accessibility object in a platform-specific adaptor that is specific to the platform-specific API.

12. The computer implemented method of claim 9 and further comprising:
providing accessibility information from the platform-independent accessibility object to the accessibility framework through the platform-specific adaptor.

13. A computing system, comprising:
a processor; and
memory storing instructions executable by the processor, wherein the instructions, when execute, configure the computing system to:

run, in a runtime environment with a particular platform, an application that generates a user interface, wherein the application creates a platform-independent accessibility object in response to a request for the platform-independent accessibility object, wherein the platform-independent accessibility object:
  is independent of the particular platform, and
  caches accessibility information corresponding to the user interface generated by the application;
receive, by a uniform application interface that is exposed to the application, the platform-independent accessibility object from the application;
based on a set of platform-specific mappings, wrap the platform-independent accessibility object in a platform adaptor that comprises a platform-specific wrapper, consumable by a platform-specific interface that is specific to the particular platform,
  wherein each platform-specific mapping, in the set of platform-specific mappings, maps the accessibility information in the platform-independent accessibility object to a different platform having an accessibility client; and
provide, by the platform-specific interface that is exposed to an accessibility framework, access to the accessibility information in the platform-independent accessibility object to the accessibility client of the particular platform through the platform-specific accessibility framework.

14. The computing system of claim 13 wherein the instructions configure the computing system to:
  wrap the platform-independent accessibility object in a platform-specific adaptor that is specific to the platform-specific interface.

15. The computing system of claim 13 wherein a platform-specific adaptor is configured to, communicate accessibility information with an accessibility client, through the accessibility framework.

* * * * *